US009275794B2

United States Patent
Kikugawa et al.

(10) Patent No.: US 9,275,794 B2
(45) Date of Patent: Mar. 1, 2016

(54) CORROSION-RESISTANT MAGNET AND METHOD FOR PRODUCING THE SAME

(75) Inventors: Atsushi Kikugawa, Osaka (JP); Koshi Yoshimura, Osaka (JP); Yoshimi Tochishita, Hyogo (JP); Masanao Kamachi, Saitama (JP); Nobuhiro Misumi, Hyogo (JP)

(73) Assignee: HITACHI METALS, LTD., Tokyo (JP)

( * ) Notice: Subject to any disclaimer, the term of this patent is extended or adjusted under 35 U.S.C. 154(b) by 753 days.

(21) Appl. No.: 13/056,387

(22) PCT Filed: Jul. 30, 2009

(86) PCT No.: PCT/JP2009/063566
§ 371 (c)(1),
(2), (4) Date: Jul. 21, 2011

(87) PCT Pub. No.: WO2010/013774
PCT Pub. Date: Feb. 4, 2010

(65) Prior Publication Data
US 2011/0273252 A1 Nov. 10, 2011

(30) Foreign Application Priority Data
Jul. 30, 2008 (JP) ................................. 2008-196150

(51) Int. Cl.
*H01F 41/02* (2006.01)
*B22F 3/24* (2006.01)
(Continued)

(52) U.S. Cl.
CPC ................ *H01F 41/026* (2013.01); *B22F 3/24* (2013.01); *B32B 15/012* (2013.01);
(Continued)

(58) Field of Classification Search
CPC ............ H01F 7/02; H01F 41/02; C23C 22/00; B22F 3/24; B32B 15/012; C22C 33/0278
USPC ....................................................... 427/126.4
See application file for complete search history.

(56) References Cited

U.S. PATENT DOCUMENTS 4,495,221 A * 1/1985 Broadbent .................... 438/679
4,497,876 A * 2/1985 Kidon ........................... 428/624
(Continued)

FOREIGN PATENT DOCUMENTS

JP 2000-150216 5/2000
JP 2001-335921 A1 12/2001
(Continued)

OTHER PUBLICATIONS

English Abstract of JP 2003171778A.*
(Continued)

*Primary Examiner* — Mandy Louie
(74) *Attorney, Agent, or Firm* — Kratz, Quintos & Hanson, LLP

(57) ABSTRACT

An object of the present invention is to provide an R—Fe—B based sintered magnet that exhibits excellent corrosion resistance and maintains excellent adhesion strength to an adherend even under severe conditions, and a method for producing the same. A corrosion-resistant magnet of the present invention as a means for achieving the object is characterized by comprising a chemical conversion film containing at least Zr, V, Al, fluorine, and oxygen as constituent elements and not containing phosphorus over a surface of an R—Fe—B based sintered magnet with a film made of Al or an alloy thereof therebetween.

1 Claim, 4 Drawing Sheets

(51) Int. Cl.
    *B32B 15/01* (2006.01)
    *C22C 33/02* (2006.01)
    *C22C 38/00* (2006.01)
    *C22C 38/10* (2006.01)
    *H01F 7/02* (2006.01)
    *H01F 1/057* (2006.01)

(52) U.S. Cl.
    CPC .......... *C22C 33/0278* (2013.01); *C22C 38/005* (2013.01); *C22C 38/10* (2013.01); *H01F 7/0221* (2013.01); *B22F 2003/242* (2013.01); *B22F 2998/00* (2013.01); *C22C 2202/02* (2013.01); *H01F 1/0577* (2013.01)

(56) References Cited

U.S. PATENT DOCUMENTS

| | | | | |
|---|---|---|---|---|
| 5,743,971 | A * | 4/1998 | Inoue et al. | 148/247 |
| 6,251,196 | B1 * | 6/2001 | Nishiuchi et al. | 148/277 |
| 6,281,774 | B1 * | 8/2001 | Nishiuchi et al. | 335/302 |
| 6,733,896 | B2 * | 5/2004 | Dolan et al. | 428/472 |
| 2001/0050029 | A1 * | 12/2001 | Inbe et al. | 106/14.44 |
| 2004/0191545 | A1 * | 9/2004 | Han et al. | 428/472 |
| 2005/0109426 | A1 * | 5/2005 | Inoue et al. | 148/258 |
| 2005/0175798 | A1 * | 8/2005 | Kurokawa et al. | 428/34.1 |
| 2008/0053573 | A1 * | 3/2008 | Sakamoto et al. | 148/301 |
| 2008/0211098 | A1 * | 9/2008 | Suzuki et al. | 257/751 |
| 2012/0208363 | A1 * | 8/2012 | Hyndman et al. | 438/652 |

FOREIGN PATENT DOCUMENTS

| | | | | |
|---|---|---|---|---|
| JP | 2003171778 A | * | 6/2003 | .............. C23C 22/53 |
| JP | 2005-78821 A1 | | 3/2005 | |
| JP | 2005-210094 A1 | | 8/2005 | |
| JP | 2006-13398 A1 | | 1/2006 | |
| WO | WO 2006/009137 | | 1/2006 | |
| WO | WO 2008/140054 | | 11/2008 | |

OTHER PUBLICATIONS

Machine translation of JP2006-013399 accessed May 1, 2015.*
International Search Report for International Application No. PCT/JP2009/063566 dated Oct. 20, 2009.

* cited by examiner

F i g .  4
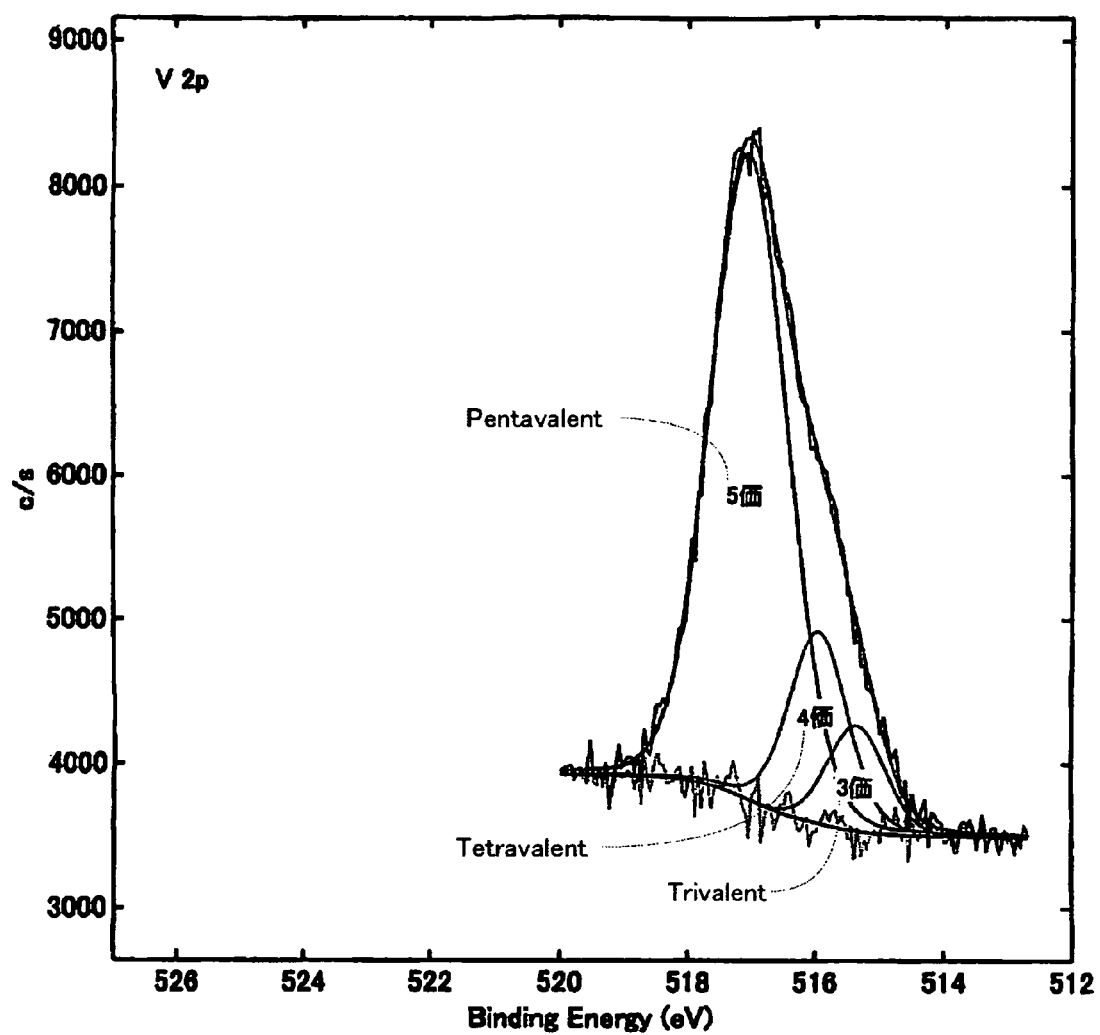

CORROSION-RESISTANT MAGNET AND METHOD FOR PRODUCING THE SAME

TECHNICAL FIELD

The present invention relates to an R—Fe—B based sintered magnet that exhibits excellent corrosion resistance and maintains excellent adhesion strength to an adherend even under severe conditions, and also to a method for producing the same.

BACKGROUND ART

Nowadays, R—Fe—B based sintered magnets represented by Nd—Fe—B based sintered magnets have been used in various fields for their high magnetic characteristics. However, an R—Fe—B based sintered magnet contains a highly reactive rare-earth metal: R, and thus is susceptible to oxidization and corrosion in air. Therefore, when such a magnet is used without a surface treatment, corrosion proceeds from the surface due to the presence of small amounts of acids, alkalis, water, etc., whereby rust occurs, causing deterioration or fluctuation in the magnetic characteristics. Further, when such a rusted magnet is incorporated into a device such as a magnetic circuit, the rust may be dispersed and contaminate peripheral parts.

Various methods are known for imparting corrosion resistance to an R—Fe—B based sintered magnet. One of them is a method in which a chemical conversion film containing at least one of Ti and Zr, phosphorus, oxygen, and fluorine as constituent elements is formed over a surface of the magnet with an Al film therebetween (Patent Document 1). This method is recognized by those skilled in the art as a method that allows a magnet to be provided with excellent corrosion resistance. However, with respect to magnets to be incorporated into automotive motors which are used in an environment with wide temperature swings and may also be exposed to chlorine ions contained in an anti-freezing agent spread on the road in a cold region or to seawater near the coast, such magnets are required to have higher corrosion resistance than magnets for domestic use. For this reason, there is a demand for the development of a method for imparting corrosion resistance to a magnet, which is superior to the method of Patent Document 1. Further, when a magnet is incorporated into a part using an adhesive, the magnet is expected to maintain excellent adhesion strength to the adherend even under severe conditions.
Patent Document 1: JP-A-2000-150216

DISCLOSURE OF THE INVENTION

Problems that the Invention is to Solve

Thus, an object of the present invention is to provide an R—Fe—B based sintered magnet that exhibits excellent corrosion resistance and maintains excellent adhesion strength to an adherend even under severe conditions, and a method for producing the same.

Means for Solving the Problems

A corrosion-resistant magnet of the present invention accomplished in light of the above points is, as defined in a first embodiment, characterized by comprising a chemical conversion film containing at least Zr, V, Al, fluorine, and oxygen as constituent elements and not containing phosphorus over a surface of an R—Fe—B based sintered magnet with a film made of Al or an alloy thereof therebetween.

A corrosion-resistant magnet as defined in a second embodiment is characterized in that in the corrosion-resistant magnet according to the first embodiment, the chemical conversion film has a thickness of 0.001 µm to 1 µm.

A corrosion-resistant magnet as defined in a third embodiment is characterized in that in the corrosion-resistant magnet according to the first embodiment, a comparison between a region of an outer-surface-side half of the thickness of the chemical conversion film and a region of a magnet-side half of the thickness of the chemical conversion film shows that the former has a higher Zr content than the latter.

A corrosion-resistant magnet as defined in a fourth embodiment is characterized in that in the corrosion-resistant magnet according to the first embodiment, a comparison between a region of an outer-surface-side half of the thickness of the chemical conversion film and a region of a magnet-side half of the thickness of the chemical conversion film shows that the former has a higher V content than the latter.

A corrosion-resistant magnet as defined in a fifth embodiment is characterized in that in the corrosion-resistant magnet according to the first embodiment, a comparison between a region of an outer-surface-side one-thrid of the thickness of the chemical conversion film, a region of central one-thrid of the thickness of the chemical conversion film, and a region of a magnet-side one-third of the thickness of the chemical conversion film shows that the region of a central one-third has the highest fluorine content.

A corrosion-resistant magnet as defined in a sixth embodiment is characterized in that in the corrosion-resistant magnet according to the first embodiment, V in the chemical conversion film exists in at least three valence states from trivalent to pentavalent, with at least 60% of V being pentavalent.

A corrosion-resistant magnet as defined in a seventh embodiment is characterized in that in the corrosion-resistant magnet according to the first embodiment, the film made of Al or an alloy thereof is a vapor deposited film; has a columnar crystalline structure grown broader from the surface of the magnet body outward to the outer surface; and has, within a one-third region thereof from the surface of the magnet body in the thickness direction, a portion where 5 to 30 intercrystalline gaps each having a width of 0.01 µm to 1 µm arc present per 10 µm length in the lateral direction of the film.

A corrosion-resistant magnet as defined in an eighth embodiment is characterized in that in the corrosion-resistant magnet according to the seventh embodiment, the film made of Al or an alloy thereof has, within a one-third region thereof from the surface of the magnet body in the thickness direction, a portion where the columnar crystalline structure has a crystal width of 0.1 µm 1 µm and has, in the other two-thirds region, a portion where the columnar crystalline structure has a crystal width of 1 µm to 5 µm.

A corrosion-resistant magnet as defined in a ninth embodiment is characterized in that in the corrosion-resistant magnet according to the seventh embodiment, the vapor deposited film is formed at an average film formation rate set at 0.1 µm/min to 0.4 µm/min until one-third of a desired film thickness is reached and then at 0.2 µm/min to 1 µm/min, the latter being always higher than the former.

A corrosion-resistant magnet as defined in a tenth embodiment is characterized in that in the corrosion-resistant magnet according to the first embodiment, the film made of Al or an alloy thereof has a thickness of 3 µm to 20 µm.

A method for producing a corrosion-resistant magnet of the present invention is, as defined in an eleventh embodiment, characterized by comprising vapor depositing a film made of Al or an alloy thereof on a surface of an R-Fe-B based sintered magnet at an average film formation rate set at 0.1 μm/min to 0.4 μm/min until one-third of a desired film thickness is reached and then at 0.2 μm/min to 1 μm/min, the latter being always higher than the former, and then forming, on the surface thereof, a chemical conversion film containing at least Zr, V, Al, fluorine, and oxygen as constituent elements and not containing phosphorus.

Effect of the Invention

The present invention enables the provision of an R—Fe—B based sintered magnet that exhibits excellent corrosion resistance and maintains excellent adhesion strength to an adherend even under severe conditions, and a method for producing the same.

BRIEF DESCRIPTION OF THE DRAWINGS

FIG. 4 A chart showing results of an analysis of the valence states of V in an outer surface portion of the chemical conversion film.

EXPLANATION OF SYMBOLS

Figure 1:
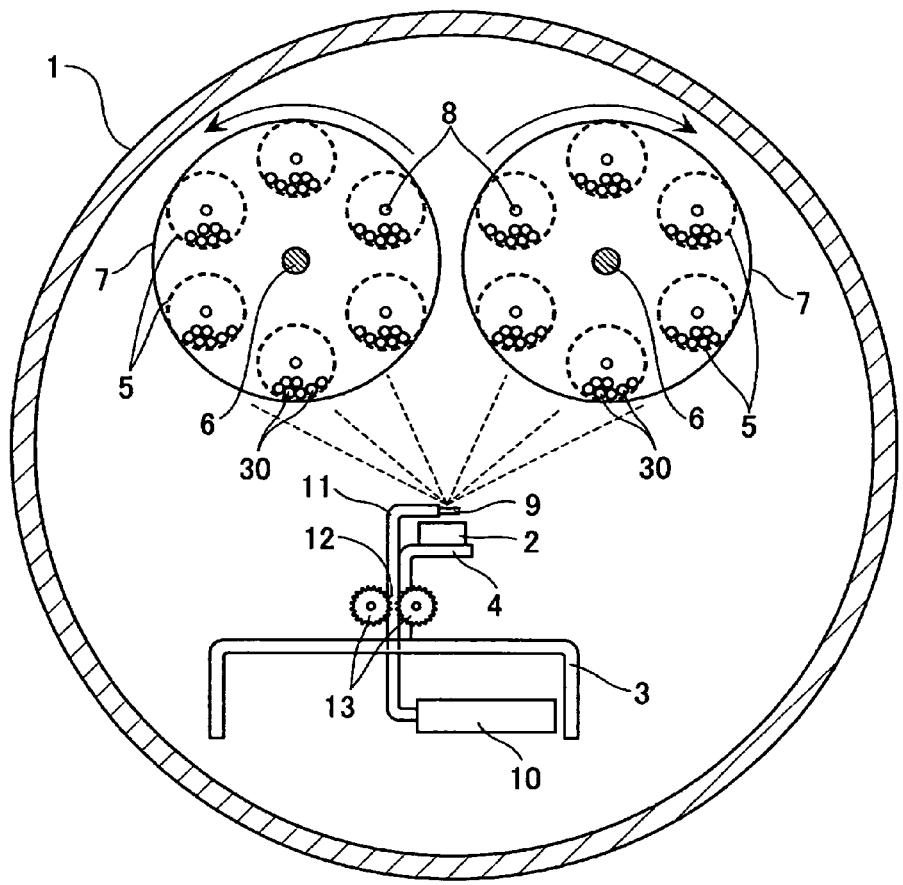
FIG. 1 A schematic front view (partial perspective view) of the inside of a vacuum treating chamber of one embodiment of an apparatus for forming a vapor deposited film, which is suitable for producing an R—Fe—B based sintered magnet having a vapor deposited film of Al or an alloy thereof.

1 Vacuum treating chamber
2 Boat (Evaporating section)
3 Support table
4 Boat support base
5 Cylindrical barrel
6 Rotary shaft
7 Support member
8 Support shaft
9 Wire as vapor deposition material
10 Feed reel
11 Thermal resistant protective tube
12 Notched window
13 Feeding gear
30 Object to be treated

BEST MODE FOR CARRYING OUT THE INVENTION

A corrosion-resistant magnet of the present invention is characterized by comprising a chemical conversion film containing at least Zr, V, Al, fluorine, and oxygen as constituent elements and not containing phosphorus over a surface of an R—Fe—B based sintered magnet with a film made of Al or an alloy thereof therebetween.

The film made of Al or an alloy thereof formed on the surface of an R—Fe—B based sintered magnet is not limited, but it is preferable that the film is a vapor deposited film; has a columnar crystalline structure grown broader from the surface of the magnet body outward to the outer surface; and has, within a one-third region thereof from the surface of the magnet body in the thickness direction, a portion where 5 to 30 intercrystalline gaps each having a width of 0.01 μm to 1 μm are present per 10 μm length in the lateral direction of the film. By forming, in at least a portion of the vapor deposited film of Al or an alloy thereof formed on the surface of an R—Fe—B based sintered magnet, columnar crystals of Al or an alloy thereof that are grown broader (broadened toward the end) from the surface of the magnet body outward to the outer surface, in other words, by forming in a lower portion of the film (the side nearer to the surface of the magnet body) columnar crystals of Al or an alloy thereof grown narrower in width than columnar crystals of Al or an alloy thereof grown in a upper portion of the film (the side nearer to the outer surface), the lower portion of the film has a large number of intercrystalline gaps, and such a region has a coarse structure. As a result, the strain or stress caused at the interface between the magnet and the film due to their difference in behavior in response to a thermal history by a heat cycle test between −40° C. and 120° C., for example, can be relaxed or absorbed. This makes it possible to prevent a decrease in peeling strength between the magnet and the film, as well as accompanying interfacial failure. When the number of intercrystalline gaps with widths of 0.01 μm to 1 μm present within a one-third region of the film from the surface of the magnet body in the thickness direction (region from the surface of the magnet body to ⅓ of the thickness of the film) is too small, it may not be possible to effectively relax or absorb the strain or stress at the interface between the magnet and the film caused by a heat cycle test. Meanwhile, when the number is too large, peeling strength of the film to the surface of the magnet may be adversely affected. It is preferable that the number of intercrystalline gaps with widths of 0.01 μm to 1 μm present within a one-third region of the film from the surface of the magnet body in the thickness direction is 10 to 25 per 10 μm length in the lateral direction of the film. An intercrystalline gap with a width of more than 1 μm may adversely affect the effectiveness of the film in imparting corrosion resistance to the magnet, so it is preferable that such an intercrystalline gap is not present.

Meanwhile, columnar crystals of Al or an alloy thereof that is formed in an upper portion of the film are provided as broad crystals, and such a region thus has a dense structure, the intrusion of acid, alkali, moisture, or the like from the outside can be prevented. As a result, the film can be highly effective in imparting corrosion resistance to the magnet (in order to improve the effectiveness, it is preferable to subject the surface of the film to a peening treatment). Under the premise that, in comparison with the number of intercrystalline gaps with widths of 0.01 μm to 1 μm present within the one-third region of the film from the surface of the magnet body in the thickness direction, the number of intercrystalline gaps with widths of 0.01 μm to 1 μm present in the other two-thirds region is fewer, when it is 10 in maximum, preferably 5 or fewer, per 10 μm length in the lateral direction of the film, such a film is highly effective in imparting corrosion resistance to the magnet.

The number of intercrystalline gaps with widths of 0.01 μm to 1 μm can be determined by counting the number of such gaps in an arbitrarily selected lateral portion of 10 μm length at an arbitrarily selected cross section taken in a longitudinal direction of the vapor deposited film of Al or an alloy thereof by observation using a field emission type scanning microscope, etc. For example, the number of gaps present within a one-third region of the film from the surface of the magnet body in the thickness direction can be measured near the center of the region in the thickness direction (i.e., approximately ⅙ from the surface of the magnet body), and the number of gaps present in the other two-thirds region can be measured near the center of the other region in the thickness direction (i.e., approximately ⅘ from the surface of the magnet body). In the measurement, it is preferable that cross-section processing is performed in advance by a processing method that does not deform the cross section of the film, such as ion beam cross-section processing.

It is preferable that in at least a portion of the vapor deposited film of Al or an alloy thereof formed on the surface of an R—Fe—B based sintered magnet, the crystal width of the columnar crystalline structure is 0.1 µm to 1 µm within a one-third region of the film from the surface of the magnet body in the thickness direction and is 1 µm to 5 µm in the other two-thirds region, because this makes it possible to effectively relax or absorb the strain or stress at the interface between the magnet and the film caused by a heat cycle test.

The vapor deposited film of Al or an alloy thereof having such a characteristic structure as stated above can be formed on the surface of an R—Fe—B based sintered magnet by, for example, controlling an average film formation rate set at 0.1 µm/min to 0.4 µm/min until one-third of the desired film thickness is reached and then at 0.2 µm/min to 1 µm/min, and preferably 0.3 µm/min to 0.6 µm/min, the latter being always higher than the former. By independently controlling the average film formation rate in the early stage and in the later stage of the film formation, the desired film formation can be achieved; the reasons for this are presumably as follows. That is, the surface of an R—Fe—B based sintered magnet immediately before the film formation has irregularities with an Ra of about 0.8 µm to about 1.5 µm by being subjected to processing and cleaning steps in advance. Also, the R—Fe—B based sintered magnet has a surface structure including an $R_2Fe_{14}B$ phase portion and an R-rich phase portion. The $R_2Fe_{14}B$ phase portion and the R-rich phase are different in susceptibility to oxidation, and the R-rich phase is more susceptible to oxidation. During the formation of a vapor deposited Al film, Al particles successively deposit on the surface of the magnet, while during the formation of a vapor deposited Al alloy film, Al particles and other metal particles forming the Al alloy successively deposit on the surface of the magnet, whereby columnar crystals grow. However, because the surface of the magnet is not uniform in shape or structure as mentioned above, in the early stage of the film formation where the average film formation rate is low, Al particles (and other metal particles) stably deposit in some portions, but not in other portions. Al particles (and other metal particles) deposit preferentially on projections or the $R_2Fe_{14}B$ phase portion, while they are less likely to deposit on depressions or the R-rich phase portion. As a result, columnar crystals of Al or an alloy thereof grown on projections or the $R_2Fe_{14}B$ phase portion are narrow, while a large number of moderate intercrystalline gaps are formed on depressions or the R-rich phase portion. Meanwhile, in the later stage of the film formation where the average film formation rate is higher than in the early stage of the film formation, a large amount of Al particles (and other metal particles) rapidly deposit on the already grown columnar crystals. Therefore, the crystals gradually broaden, and fewer intercrystalline gaps are formed accordingly. As a result, the thus-formed vapor deposited film of Al or an alloy thereof has such a structure that it is coarse in a lower portion and dense in an upper portion.

A method for forming such a vapor deposited film of Al or an alloy thereof on the surface of an R—Fe—B based sintered magnet as stated above can be easily implemented by using, for example, an apparatus for forming a vapor deposited film in which a vapor deposition source of Al or an alloy thereof is supplied to an evaporating section for a vapor deposition material by wire feed method, and the vapor deposition source of Al or an alloy thereof is evaporated by resistance heating method in the evaporating section. An example thereof is an apparatus for forming a vapor deposited film described in JP-A-2001-335921, which comprises a vacuum treating chamber in which an evaporating section for a vapor deposition material and a cylindrical barrel formed of a mesh for accommodating therein the object having a surface on which a vapor deposition material is to be vapor deposited are located; the cylindrical barrel is supported circumferentially outside a horizontal rotational axis of a support member rotatable about the rotational axis, for rotation about the rotational axis; the distance between the cylindrical barrel rotated about the rotational axis of the support member and the evaporating section can be varied by rotating the support member, and a wire-shaped vapor deposition material is continuously supplied to the heated evaporating section and thus evaporated, whereby a vapor deposited film can be formed on the surface of the object to be treated.

FIG. 1 is a schematic front view (partial perspective view) of the inside of a vacuum treating chamber of one embodiment of the apparatus for forming a vapor deposited film as stated above, which is described in JP-A-2001-335921. At the upper portion in the vacuum treating chamber 1, which is connected to a non-illustrated vacuum evacuation system, two support members 7 are disposed side by side. Each support member 7 is rotatable about a rotary shaft 6 on a horizontal rotational axis. Six cylindrical barrels 5 formed of a mesh net of a stainless steel are supported in an annular shape circumferentially outside the rotary shaft 6 of each support member 7 by support shafts 8 for rotation about the rotational axis. At the lower portion in the vacuum treating chamber 1, a plurality of boats 2 that are evaporating sections for evaporating a vapor deposition material are disposed on a boat support base 4 risen on a support table 3. A wire 9 as a vapor deposition material is retained and wound around a feed reel 10 below the support table 3. The proceeding end of the wire 9 as the vapor deposition material is guided to above the boat 2 by a thermal resistant protective tube 11 facing toward an inner surface of the boat 2. A notched window 12 is provided in a portion of the protective tube 11. A feeding gear 13 mounted in correspondence to the notched window 12 is brought into direct contact with the wire 9 as the vapor deposition material, such that the vapor deposition material can be continuously supplied into the boat 2 by feeding the wire 9 as the vapor deposition material. By adjusting the feeding speed of the wire 9 as the vapor deposition material, the film formation rate of a vapor deposited film can be controlled as desired. Further, when the support member 7 is rotated about the rotary shaft 6 (see the arrow in FIG. 1), in response to the rotation, the cylindrical barrel 5 supported by the support shaft 8 circumferentially outside the rotary shaft 6 of the support member 7 is rotated about the rotary shaft 6. As a result, the distance between each cylindrical barrel and the evaporating section disposed underneath the support member is varied, achieving the following effects. That is, a cylindrical barrel located at a lower portion of the support member 7 is close to the evaporating section. Therefore, on the surface of an object to be treated 30 accommodated in such a cylindrical barrel, a vapor deposited film is efficiently formed. Meanwhile, an object to be treated accommodated in a cylindrical barrel moved away from the evaporating section is freed from the heating state and is cooled according to the movement away from the evaporating section. Accordingly, during this period, the softening of the vapor deposited film formed on the surface thereof is prevented from occurring. Thus, use of this apparatus for forming a vapor deposited film makes it possible to simultaneously achieve the efficient formation of a vapor deposited film and the suppression of softening of the formed vapor deposited film.

The thickness of the vapor deposited film of Al or an alloy thereof formed on the surface of an R—Fe—B based sintered magnet is preferably 3 μm to 20 μm. This is because when the thickness is less than 3 μm, effectiveness in imparting excellent corrosion resistance to the magnet may not be obtained, for example, while when the thickness is more than 20 μm, the film formation takes a long period of time, and, accordingly, the narrow columnar crystals of Al or an alloy thereof formed in a lower portion of the film may grow in the lateral direction, resulting in a decrease of the number of intercrystalline gaps in the lower portion of the film, thereby breaking the coarse structure.

When the vapor deposited film formed on the surface of an R—Fe—B based sintered magnet is a vapor deposited Al alloy film, the content of metal component other than Al is preferably 10 mass % or less. For example, a vapor deposited Al alloy film having Mg in a content of 3 mass % to 7 mass % as a metal component other than Al has high salt water resistance and thus is preferable. The vapor deposited film of Al or an alloy thereof may have trace amounts of inevitable components.

As a method for forming a chemical conversion film containing at least Zr, V, Al, fluorine, and oxygen as constituent elements and not containing phosphorus on the surface of the film made of Al or an alloy thereof formed on the surface of the R—Fe—B based sintered magnet, for example, a method in which an aqueous solution containing at least Zr, V, and fluorine is applied as a treatment liquid to the surface of the film made of Al or an alloy thereof, followed by drying, can be mentioned. A specific example of the treatment liquid is a solution prepared by dissolving a compound containing Zr and fluorine, such as fluorozirconic acid ($H_2ZrF_6$), or an alkali metal salt, an alkaline earth metal salt or an ammonium salt of fluorozirconic acid, and a V compound, such as vanadium pentoxide and vanadium sulfate, in water (hydrofluoric acid or the like may be further added). The Zr content and the V content of the treatment liquid are each preferably 1 ppm to 2000 ppm as metal, and more preferably 10 ppm to 1000 ppm. This is because when the content is less than 1 ppm, a chemical conversion film may not be formed, while a content of more than 2000 ppm may increase the cost. The fluorine content of the treatment liquid is preferably 0.1 ppm to 10000 ppm as fluorine concentration, and more preferably 1 ppm to 100 ppm. This is because when the content is less than 0.1 ppm, the surface of the film made of Al or an alloy thereof may not be efficiently etched, while a content of more than 10000 ppm may result in an etching rate higher than the rate of film formation, making it difficult to form a uniform film. The treatment liquid may also be prepared by dissolving a fluorine-free Zr compound, such as a sulfate or nitrate of Zr, a V compound, and a Zr-free fluorine compound, such as hydrofluoric acid, ammonium fluoride, ammonium hydrogen fluoride, sodium fluoride, or sodium hydrogen fluoride, in water. The treatment liquid may have a source of Al, a constituent element of the chemical conversion film, or may have no such source. This is because as the film made of Al or an alloy thereof formed on the surface of the R—Fe—B based sintered magnet is etched in the course of chemical conversion treatment, Al is eluted from the film and incorporated into the chemical conversion film. The pH of the treatment liquid is preferably adjusted to 1 to 6, and more preferably 3 to 5. This is because when the pH is less than 1, the surface of the film made of Al or an alloy thereof may be excessively etched, while a pH of more than 6 may affect the stability of the treatment liquid. In the case where the film made of Al or an alloy thereof is a vapor deposited film, the oxide layer spontaneously formed on the surface thereof is relatively thin. Accordingly, even after the oxide layer is formed, the film still has high surface activity. Therefore, even when the treatment liquid has a pH of 3 to 5, a chemical conversion reaction takes place efficiently, so there is no need to subject the film to an etching treatment using acid or alkali, alcohol degreasing, etc., prior to chemical conversion treatment.

For the purpose of improving the reactivity in the chemical conversion treatment, improving the stability of the treatment liquid, improving the adherence between the chemical conversion film and the surface of the film made of Al or an alloy thereof formed on the surface of the R—Fe—B based sintered magnet, improving the adhesiveness with an adhesive used for the incorporation of the magnet into a part, etc., the treatment liquid may also contain, in addition to the above components, organic acids such as tannic acid, oxidizing agents (hydrogen peroxide, chloric acid and salts thereof, nitrous acid and salts thereof, nitric acid and salts thereof, tungstic acid and salts thereof, molybdenum acid and salts thereof, etc.), water-soluble resins such as water-soluble polyamide and polyallylamine, etc.

In the case where the treatment liquid itself lacks storage stability, such a treatment liquid may be prepared when needed. An example of a commercially available treatment liquid usable in the present invention is PALCOAT 3762 (trade name) manufactured by NIHON PARKERIZING CO., LTD.

As a method for applying the treatment liquid to the film made of Al or an alloy thereof formed on the surface of the R—Fe—B based sintered magnet, immersion, spraying, spin coating, or the like can be employed. Upon application, the temperature of the treatment liquid is preferably 20° C. to 80° C., and more preferably 40° C. to 60° C. This is because when the temperature is less than 20° C., the reaction may not proceed, while a temperature of more than 80° C. may affect the stability of the treatment liquid. The treatment time is usually 10 seconds to 30 minutes.

After the treatment liquid is applied to the surface of the film made of Al or an alloy thereof, a drying treatment is performed. When the temperature of the drying treatment is less than 50° C., sufficient drying cannot be achieved, and this may degrade the appearance or affect the adhesiveness with an adhesive used for the incorporation of the magnet into a part. When the temperature is more than 250° C., this may cause decomposition of the formed chemical conversion film. Therefore, the temperature is preferably 50° C. to 250° C. From the viewpoint of productivity and production cost, a temperature of 50° C. to 200° C. is more preferable. The drying treatment time is usually 5 seconds to 1 hour.

The chemical conversion film containing at least Zr, V, Al, fluorine, and oxygen as constituent elements and not containing phosphorus formed by the above method on the surface of the film made of Al or an alloy thereof formed on the surface of the R—Fe—B based sintered magnet is firmly in close contact with the film made of Al or an alloy thereof. Therefore, when the thickness of the film is 0.001 μm or more, together with the corrosion resistance of the film made of Al or an alloy thereof, the film exhibits excellent corrosion resistance even under severe conditions. The upper limit of the thickness of the chemical conversion film is not limited. However, for demands based on the miniaturization of a magnet itself and also from the viewpoint of production cost, the thickness is preferably 1 μm or less, more preferably 0.5 μm or less, and further preferably 0.1 μm or less. The chemical conversion film formed on the surface of the film made of Al or an alloy thereof is characterized in that a comparison between a region of the outer-surface-side half of its thickness and a region of the magnet-side half of its thickness shows that the former has a higher Zr content than the latter. Therefore, the region of the outer-surface-side half contains a large amount of Zr-containing compound. The Zr-containing compound may be Zr oxide with excellent corrosion resistance, for example, and it is presumed that the presence of Zr oxide contributes to the corrosion resistance of the chemical conversion film. The region of the outer-surface-side half has a maximum Zr content of 10 at % to 20 at % in the thickness direction thereof. The chemical conversion film is also characterized in that a comparison between a region of the outer-surface-side half of its thickness and a region of the magnet-side half of its thickness shows that the former has a higher V content than the latter. The region of the outer-surface-side half has a maximum V content of 5 at % to 15 at % in the thickness direction thereof. The chemical conversion film is further characterized in that a comparison between a region of the outer-surface-side one-third of its thickness, a region of the central one-third of its thickness, and a region of the magnet-side one-third of its thickness shows that the region of the central one-third has the highest fluorine content. The region of the central one-third has a maximum fluorine content of 10 at % to 20 at % in the thickness direction thereof. Such a characteristic film configuration is more prominent when chemical conversion treatment is performed using a treatment liquid adjusted to pH 3 to 5. The reasons for this are believed to be as follows. In a chemical conversion reaction at a pH of 3 to 5 on the surface of a film made of Al or an alloy thereof, in the early stage to the middle stage of the reaction, an Al- and fluorine-containing compound is actively formed, and thus the fluorine content in the chemical conversion film gradually increases. However, after that, the precipitation of a Zr-containing compound and a V-containing compound from the treatment liquid proceeds. As a result, the fluorine content in the chemical conversion film decreases, while the Zr content and the V content increase. Presumably, such a characteristic film configuration enhances the self-repairing action of the chemical conversion film, and thus the chemical conversion film itself exhibits sufficient corrosion resistance. Of special note is that V in the chemical conversion film exists in at least three valence states from trivalent to pentavalent, with at least 60% of V being pentavalent (upper limit is about 85%), and it is believed that the self-repairing action produced in the reduction in the valence of pentavalent V contributes to the corrosion resistance of the chemical conversion film. Further, the surface of the chemical conversion film has fine irregularities which improve the so-called anchoring effect. Accordingly, excellent adhesion strength to an adherend is provided even under severe conditions.

As a pre-process prior to the formation of a chemical conversion film on the surface of the film made of Al or an alloy thereof, shot peening (a process in which a surface is bombarded with hard particles and thereby modified) may be performed. The film made of Al or an alloy thereof can be smooth and dense by shot peening, making it easier to form a chemical conversion film that has excellent corrosion resistance even when the film is thin. As a powder for shot peening, one having a hardness equal to or greater than the hardness of the film made of Al or an alloy thereof is preferable. Examples thereof are spherical hard powders having a Mohs hardness of 3 or more, such as steel balls, glass beads, etc. When the powder has an average particle size of less than 30 μm, the pushing force against the film is low, and it takes time to complete the treatment. Meanwhile, when the average particle size is more than 3000 μm, the resulting surface roughness may be too high, forming an uneven finished surface. Therefore, the average particle diameter of the powder is preferably 30 μm to 3000 μm, and more preferably 40 μm to 2000 μm. The injection pressure for shot peening is preferably 1.0 kg/cm$^2$ (0.098 MPa) to 5.0 kg/cm$^2$ (0.49 MPa). When the injection pressure is less than 1.0 kg/cm$^2$, the pushing force against the film is low, and it takes time to complete the treatment, while when it is more than 5.0 kg/cm$^2$, the pushing force against the film may be uneven, causing deterioration in terms of surface roughness. The injection time for shot peening is preferably 1 minute to 1 hour. This is because when the injection time is less than 1 minute, the entire surface may not be uniformly treated, while when it is more than 1 hour, this may cause deterioration in terms of surface roughness.

The rare-earth element (R) in the R—Fe—B based sintered magnet used in the present invention may include at least one of Nd, Pr, Dy, Ho, Tb, and Sm, and may further include at least one of La, Ce, Gd, Er, Eu, Tm, Yb, Lu, and Y. Although a single kind of R is usually sufficient, in practical application, a mixture of two or more kinds (misch metal, didym, etc.) may also be used for the reason of availability. With respect to the R content of the R—Fe—B based sintered magnet, when it is less than 10 at %, an α-Fe phase precipitates, and thus high magnetic characteristics, particularly high magnetic coercive force (iHc), cannot be obtained. Meanwhile, when it is more than 30 at %, this results in an increased amount of R-rich non-magnetic phase, reducing the residual magnetic flux density (Br), whereby a permanent magnet with excellent characteristics cannot be obtained. Accordingly, the R content is preferably 10 at % to 30 at % of the composition.

With respect to the Fe content, when it is less than 65 at %, the Br decreases, while when it is more than 80 at %, high iHc cannot be obtained. Accordingly, the Fe content is preferably 65 at % to 80 at %. Further, by substituting a part of Fe with Co, the temperature characteristics of the resulting magnet can be improved without impairing its magnetic characteristics. However, when the Co substitution amount is more than 20 at % of Fe, the magnetic characteristics are degraded, and this thus is undesirable. A Co substitution amount of 5 at % to 15 at % leads to a higher Br than in the case where substitution is not performed, and this thus is desirable in order to obtain a high magnetic flux density.

With respect to the B content, when it is less than 2 at %, the resulting main phase has a rhombohedron structure, and high iHc cannot be obtained, while when it is more than at %, this results in an increased amount of B-rich non-magnetic phase, whereby the Br decreases, and a permanent magnet with excellent characteristics cannot be obtained. Accordingly, the B content is preferably 2 at % to 28 at %. In order to improve the magnet productivity or reduce the price, the magnet may contain at least one of 2.0 wt % or less P and 2.0 wt % or less S in a total amount of 2.0 wt % or less. Further, a part of B may be substituted with C in an amount of 30 wt % or less so as to improve the corrosion resistance of the magnet.

Further, the addition of at least one of Al, Ti, V, Cr, Mn, Bi, Nb, Ta, Mo, W, Sb, Ge, Sn, Zr, Ni, Si, Zn, Hf, and Ga is effective in improving magnetic coercive force or the squareness of the demagnetization curve, improving productivity, and reducing the price. Regarding the amount to be added, because a Br of at least 9 kG is required in order to achieve an maximum energy product (BH) max of 20 MGOe or more, it is preferable to add an amount within a range that satisfies such conditions. In addition to R, Fe, and B, the R—Fe—B based sintered magnet may also contain impurities inevitable in the industrial production.

Of R—Fe—B based sintered magnets for use in the present invention, a magnet characterized by including a compound with a tetragonal-system crystal structure as the main phase, where the average crystal particle diameter is within a range of 1 μm to 80 μm, and having a non-magnetic phase (excluding the oxide phase) in a proportion of 1% to 50% by volume shows iHc≥1 kOe, Br>4 kG, and (BH)max≥10 MGOe, with the maximum (BH)max being 25 MGOe or more.

In addition, another corrosion-resistant film may further be laminated and formed on the surface of the chemical conversion film of the present invention. Such a configuration makes it possible to enhance/complement the properties of the chemical conversion film of the present invention or impart further functionalities.

EXAMPLES

Hereinafter, the present invention will be described in detail with reference to the examples, but the scope of the present invention is not limited to the following description. The following Examples and Comparative Example were performed using a sintered magnet having a dimension of 50 mm in height×20 mm in length×2 mm in width and a composition of $Nd_{14}Fe_{79}B_6Co_1$ (at %) (hereinafter referred to as a magnet test piece), which was obtained, according to a process described in U.S. Pat. No. 4,770,723 and U.S. Pat. No. 4,792,368, for example, by pulverizing a known cast ingot and then finely grinding the same, followed by a pressing, a sintering, a heat treatment, and a surface working.

Example 1

Step 1

Formation of Vapor Deposited Al Film on Surface of Magnet Test Piece

The step was performed as follows using the apparatus for forming a vapor deposited film shown in FIG. 1. As the 12 cylindrical barrels disposed in the vacuum treating chamber, barrels each having a diameter of 110 mm and a length of 600 mm and fabricated using a mesh net of a stainless steel (opening area: approximately 80%, opening shape: 10 mm×10 mm square, wire width: 2 mm) were used.

The magnet test piece was sandblasted to remove an oxide layer which had been formed on the surface of the test piece during the surface working in the previous step. Fifty such magnet test pieces from which the oxide layer had been removed were placed inside each cylindrical barrel. The vacuum chamber was vacuum evacuated to a total pressure of $5\times10^{-2}$ Pa or less, and then Ar gas was introduced thereinto to give a total pressure of 1 Pa. Subsequently, while rotating the rotary shaft of each barrel at 5.0 rpm, glow discharge was performed for 15 minutes under conditions including a bias voltage of −0.3 kV to clean the surfaces of the magnet test pieces.

Subsequently, while rotating the rotary shaft of the barrel at 5.0 rpm under conditions including an Ar gas pressure of 1 Pa and a bias voltage of −0.3 kV, an Al wire was continuously supplied to the evaporating section at an Al wire feeding speed adjusted such that the film formation rate of the vapor deposited Al film was of 0.2 μm/min. The Al wire was thus heated, evaporated, and ionized, and ion plating was performed for 15 minutes, followed by ion plating for 12 minutes at a film formation rate of 0.5 μm/min, thereby forming a vapor deposited Al film with a thickness of 9 μm on the surface of each magnet test piece. The vapor deposited Al film formed as described above on the surface of each magnet test piece was subjected to shot peening for 10 minutes with glass beads having a Mohs hardness of 6 and an average particle size of 120 μm (injection pressure: 0.2 MPa) to make the film surface smooth and dense.

Such a magnet test piece having the shot peened vapor deposited Al film on the surface thereof was adhered to a yoke material using an adhesive to give a joined test body for a heat cycle test. As the yoke material, carbon steel S45C having a sandblasted surface was used. As the adhesive, a thermosetting epoxy adhesive XNR3628 (manufactured by NAGASE CHEMTEX CORPORATION) was used. The thickness of the adhesive was specified by incorporating a Nichrome wire with a wire diameter of ϕ 200 μm between the yoke material and the magnet test piece having the vapor deposited Al film on the surface thereof.

The heat cycle test on the joined test body was performed using an air-to-air thermal shock chamber NT510 (manufactured by KUSUMOTO CHEMICALS, LTD.) by setting 1 cycle at conditions of 120° C. for 30 minutes to −40° C. for 30 minutes. The temperature of the joined test body was checked by inserting a thermocouple into the joined test body. The adhesion strength of the joined test body before carrying out the heat cycle test was compared with the adhesion strengths after 200 cycles and 400 cycles, thereby evaluating the performance of the vapor deposited Al film formed on the surface of the magnet test piece. The evaluation was performed as follows. The shear strength of the joined test body was measured before carrying out the heat cycle test and after 200 cycles and 400 cycles using a universal testing machine AG-10TB (manufactured by SHIMADZU CORPORATION) at a crosshead speed of 2 mm/min, and the shear strength reduction ratio after 200 cycles and 400 cycles from before the heat cycle test was evaluated as the adhesion strength reduction ratio. As a result, because of the independent control of the film formation rate of the vapor deposited Al film formed on the surface of the magnet test piece in the early stage and in the later stage of the film formation, the adhesion strength reduction ratio was only 6% after 200 cycles and 20% even after 400 cycles. The joined test body exhibited extremely excellent resistance to the heat cycle. Further, after the measurement of shear strength, the appearance of the fracture surface showed signs attributable to cohesive failure of the adhesive, showing that peeling strength between the magnet test piece and the vapor deposited Al film and adhesion strength between the vapor deposited Al film and the adhesive are both extremely high.

Figure 2:
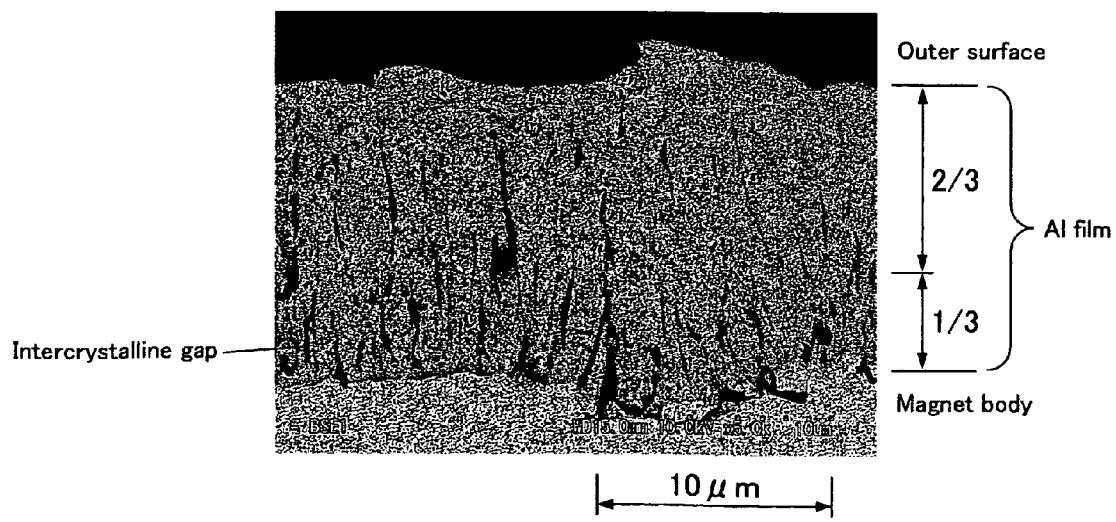
FIG. 2 A cross-sectional photograph of a vapor deposited Al film formed on the surface of a magnet test piece in Example 1.

The magnet test piece having the shot peened vapor deposited Al film on the surface thereof was also subjected to cross-section processing using an ion beam cross-section polisher SM09010 (manufactured by JEOL LTD.), and the processed cross section was then observed using a field emission type scanning electron microscope S-4300 (manufactured by HITACHI, LTD.). FIG. 2 shows a cross-sectional photograph of the vapor deposited Al film formed on the surface of the magnet test piece. As is obvious from FIG. 2, the following were shown. In the vapor deposited Al film formed on the surface of the magnet test piece, within a one-third region thereof from the surface of the magnet test piece in the thickness direction, a large number of narrow Al columnar crystals with crystal widths of 0.1 μm to 1 μm are present, and also, there are a large number of portions where 10 to 15 intercrystalline gaps with widths of 0.01 μm to 1 μm are present per 10 μm length in the lateral direction of the film. Meanwhile, the Al columnar crystals forming the other two-thirds region have large crystal widths of 1 μm to 5 μm, and also, there are a large number of portions where no intercrystalline gap with a width of 0.01 μm to 1 μm is present or, if any, about 5 or fewer such intercrystalline gaps are present per 10 μm length in the lateral direction of the film. This suggests that the reason why the magnet test piece having the vapor deposited Al film on the surface thereof obtained in this example maintains excellent adhesion strength to a yoke material as shown above and exhibits excellent corrosion resistance even after a heat cycle test (a moisture resistance test was separately performed at 80° C.×90% RH, and it was confirmed that the magnet test piece does not rust and exhibits excellent corrosion resistance even after the elapse of 500 hours) is attributable to such a characteristic structure of the vapor deposited Al film formed on the surface of the magnet test piece.

Step 2

Formation of Chemical Conversion Film on Surface of Vapor Deposited Al Film

A magnet test piece obtained in the step 1 having a shot peened vapor deposited Al film on the surface thereof was ultrasonically cleaned with water for 1 minute, and then immersed in a treatment liquid, which was prepared by dissolving 70 g of PALCOAT 3762 in 1 liter of ion exchange water and adjusted the pH thereof to 4.0 with sodium hydrogen carbonate, at a bath temperature of 50° C. for 5 minutes to perform chemical conversion treatment. The magnet was removed from the treatment liquid, then washed with water, and subjected to a drying treatment at 100° C. for 20 minutes, thereby forming a chemical conversion film with a thickness of about 20 nm on the surface of the vapor deposited Al film.

The thus-obtained magnet test piece having the chemical conversion film over the surface thereof with the vapor deposited Al film therebetween was subjected to a depth profile analysis of the chemical conversion film by Auger spectroscopy (PHI/680 manufactured by ULVAC-PHI, INCORPORATED was used as the apparatus). The results of analysis are shown in FIG. 3.

Figure 3:
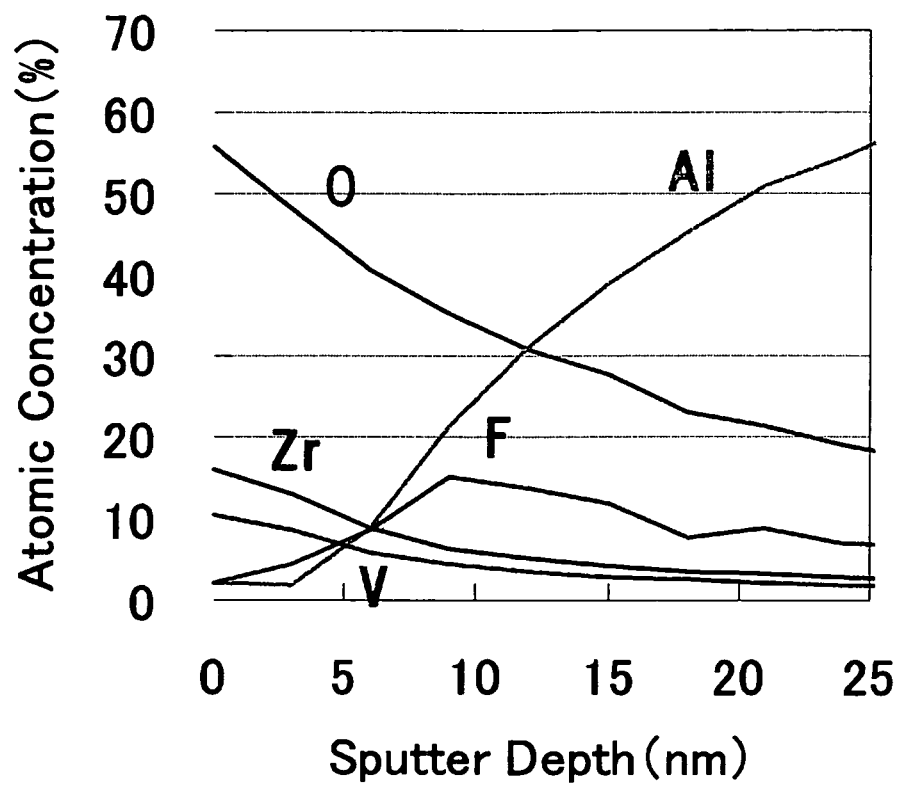
FIG. 3 A chart showing results of an Auger spectroscopy depth profile analysis of a chemical conversion film formed on the surface of the vapor deposited Al film.

As is obvious from FIG. 3, a region at a depth of 10 nm from the outer surface of the chemical conversion film (a region of the outer-surface-side half of the thickness) is characterized by having a high Zr content and a high V content, showing that this region contains large amounts of Zr-containing compound (e.g., Zr oxide) and V-containing compound. The contents of constituent elements in this region were as follows: Zr: 6 at % to 16 at %, V: 4 at % to 10 at %, Al: 2 at % to 25 at %, fluorine: 2 at % to 15 at %, and oxygen: 33 at % to 56 at %. The maximum fluorine content in the thickness direction was observed in about 10 nm near the center of the film.

The magnet test piece having the chemical conversion film over the surface thereof with the vapor deposited Al film therebetween was subjected to a salt spray test (35° C., 5% NaCl, pH 7) for 400 hours, and the rust area percentage (formed in the magnet test piece at defects in the film or where the film is thin) was determined by image processing. As a result, the percentage was 0.09%. It was thus shown that the magnet test piece having the chemical conversion film over the surface thereof with the vapor deposited Al film therebetween has extremely high corrosion resistance. Further, the magnet test piece having the chemical conversion film over the surface thereof with the vapor deposited Al film therebetween was subjected to the same heat cycle test as the test performed in the step 1. As a result, the adhesion strength reduction ratio was 5% after 200 cycles and 16% after 400 cycles, showing that the formation of the chemical conversion film on the surface of the vapor deposited Al film improves resistance to the heat cycle. Such a result was considered to be attributable to the fact that the surface of the chemical conversion film has fine irregularities which improve the so-called anchoring effect, thereby providing extremely high adhesion strength between the chemical conversion film and the adhesive.

Figure 5:
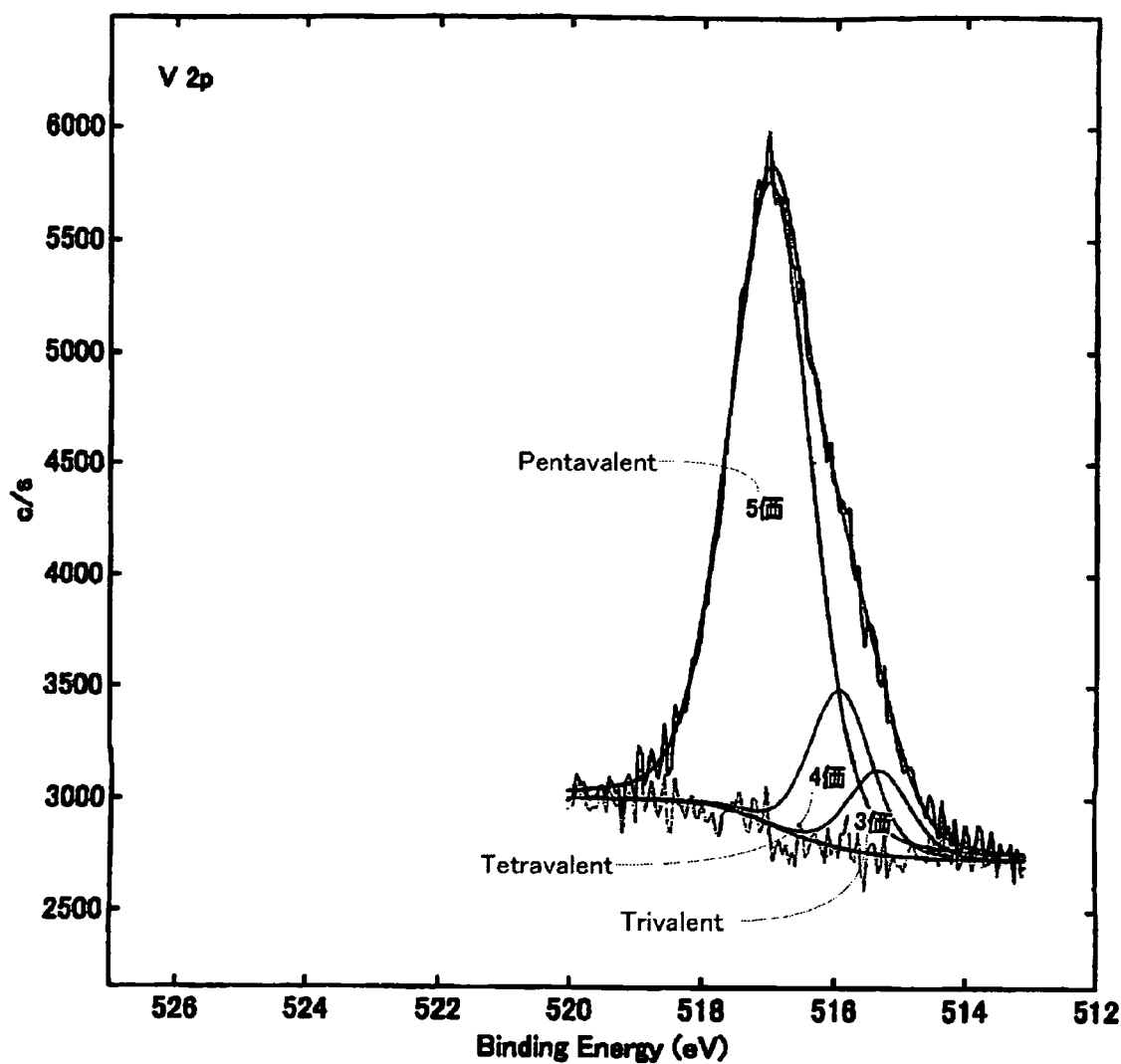
FIG. 5 A chart showing results of an analysis of the valence states of V in an interface portion of the chemical conversion film facing the vapor deposited Al film.

Further, the obtained magnet test piece having the chemical conversion film over the surface thereof with the vapor deposited Al film therebetween was cut obliquely, and at some points on the exposed surface of the chemical conversion film in the thickness direction, the valence states of V were analyzed using a scanning X-ray electron spectroscopy analyzer (μ-ESCA) (Quantera SXM manufactured by ULVAC-PHI, INCORPORATED was used as the apparatus, and the X-ray beam diameter was ϕ 100 μm). FIG. 4 shows the results of the analysis of the outer surface portion of the chemical conversion film, and FIG. 5 shows the results of the analysis of the interface portion facing the vapor deposited Al film. Table 1 shows the valence distribution of V in each portion. As is obvious from FIG. 4, FIG. 5, and Table 1, in each portion of the chemical conversion film, V exists in three valence states from trivalent to pentavalent, with at least 70% of V being pentavalent. The valence distributions were thus similar.

TABLE 1

|  | Trivalent | Tetravalent | Pentavalent |
| --- | --- | --- | --- |
| Outer surface portion | 8.7 | 17.3 | 74.0 |
| Interface portion facing vapor deposited Al film | 7.6 | 14.4 | 78.0 |

(Unit: %)

Example 2

In place of the chemical conversion treatment conditions applied to the surface of the vapor deposited Al film in the step 2 in Example 1, chemical conversion treatment conditions were selected within the following ranges to form a chemical conversion film: pH of treatment liquid: 3.0 to 4.5, bath temperature: 40° C. to 60° C., and immersion time: 3 minutes to 10 minutes (except the conditions employed in Example 1). In otherwise the same manner as in Example 1, a magnet test piece having a chemical conversion film with a thickness of about 20 nm over the surface thereof with a vapor deposited Al film with a thickness of 9 μm therebetween was obtained, and subjected to the same salt spray test as the test performed in the step 2 in Example 1 to determine the rust area percentage. As a result, the percentage was 4% or less in any case.

Comparative Example 1

In place of the chemical conversion treatment conditions applied to the surface of the vapor deposited Al film in the step 2 in Example 1, the chemical conversion treatment conditions described in Patent Document 1 using PALCOAT 3756MA and PALCOAT 3756 MB (both trade names of NIHON PARKERIZING CO., LTD.) (for forming a chemical conversion film containing Zr, phosphorus, oxygen, and fluorine as constituent elements) were employed to form a chemical conversion film. In otherwise the same manner as in Example 1, a magnet test piece having a chemical conversion film with a thickness of about 20 nm over the surface thereof with a vapor deposited Al film with a thickness of 9 μm therebetween was obtained, and subjected to the same salt spray test as the test performed in the step 2 in Example 1 to determine the rust area percentage. As a result, the percentage was 10%.

Example 3

An Al alloy wire containing 5 mass % Mg (according to JIS A5356) was used. In otherwise the same manner as in the step 1 in Example 1, a vapor deposited Al alloy film with a thickness of 9 μm and containing 5 mass % Mg was formed on the surface of a magnet test piece. The vapor deposited Al alloy film was subjected to shot peening and then the same evaluations as in step 1 in Example 1. As a result, the adhesion strength reduction ratio was only 8% after 200 cycles. The joined test body exhibited extremely excellent resistance to the heat cycle. Further, after the measurement of shear strength, the appearance of the fracture surface showed signs attributable to cohesive failure of the adhesive, showing that peeling strength between the magnet test piece and the vapor deposited Al alloy film and adhesion strength between the vapor deposited Al alloy film and the adhesive are both extremely high. As a result of the observation of a cross section of the vapor deposited Al alloy film formed on the surface of the magnet test piece, the following were shown. In the vapor deposited Al alloy film formed on the surface of the magnet test piece, within a one-third region thereof from the surface of the magnet test piece in the thickness direction, a large number of narrow Al alloy columnar crystals with crystal widths of 0.1 μm to 1 μm are present, and also, there are a large number of portions where 10 to 15 intercrystalline gaps with widths of 0.01 μm to 1 μm are present per 10 μm length in the lateral direction of the film. Meanwhile, the Al alloy columnar crystals forming the other two-thirds region have large crystal widths of 1 μm to 5 μm, and also, there are a large number of portions where no intercrystalline gap with a width of 0.01 μm to 1 μm is present or, if any, about 5 or fewer such intercrystalline gaps are present per 10 μm length in the lateral direction of the film. Thus, the vapor deposited Al alloy film had a structure similar to the structure of the vapor deposited Al film formed on the surface of the magnet test piece in the step 1 in Example 1.

The shot peened vapor deposited Al alloy film on the surface of the magnet test piece was subjected to chemical conversion treatment under the same chemical conversion treatment conditions as the conditions in the step 2 in Example 1, thereby forming a chemical conversion film with a thickness of about 20 nm on the surface of the vapor deposited Al alloy film. The obtained magnet test piece having the chemical conversion film over the surface thereof with the vapor deposited Al alloy film therebetween was subjected to the same salt spray test as the test performed in the step 2 in Example 1 to determine the rust area percentage. As a result, the percentage was 1%.

INDUSTRIAL APPLICABILITY

According to the present invention, an R—Fe—B based sintered magnet that exhibits excellent corrosion resistance and maintains excellent adhesion strength to an adherend even under severe conditions can be provided, as well as a method for producing the same. In this respect, the present invention is industrially applicable.

The invention claimed is:

1. A method for producing a corrosion-resistant magnet characterized by comprising vapor depositing a film made of Al or an alloy thereof on a surface of an R—Fe—B based sintered magnet at a first average film formation rate set at 0.1 μm/min to 0.4 μm/min until one-third of a desired film thickness is reached and then at a second average film formation rate of 0.2 μm/min to 1 μm/min, the second average film formation rate being always higher than the first average film formation rate, and then forming, on the surface of the deposited film, a chemical conversion film containing at least Zr, V, Al, fluorine, and oxygen as constituent elements and not containing phosphorus,
wherein the corrosion-resistant magnet is characterized in that a region of an outer-surface-side half of the thickness of the chemical conversion film has a higher Zr content than a region of a magnet-side half of the thickness of the chemical conversion film.

* * * * *